US012726043B2

(12) United States Patent
Ortega et al.

(10) Patent No.: US 12,726,043 B2
(45) Date of Patent: Sep. 1, 2026

(54) EMERGENCY LIGHTING SYSTEM

(71) Applicant: ABL IP Holding, LLC, Atlanta, GA (US)

(72) Inventors: David Ortega, Atlanta, GA (US); Leonard De Oto, Atlanta, GA (US); Alexander Abel, Atlanta, GA (US)

(73) Assignee: ABL IP Holding, LLC, Atlanta, GA (US)

( * ) Notice: Subject to any disclaimer, the term of this patent is extended or adjusted under 35 U.S.C. 154(b) by 34 days.

(21) Appl. No.: 18/671,491

(22) Filed: May 22, 2024

(65) Prior Publication Data

US 2025/0364833 A1 Nov. 27, 2025

(51) Int. Cl.

| | |
|---|---|
| ***H02J 9/06*** | (2006.01) |
| ***H02J 7/00*** | (2026.01) |
| ***H02J 7/44*** | (2026.01) |
| ***H02J 7/82*** | (2026.01) |
| ***H02J 7/90*** | (2026.01) |

(52) U.S. Cl.

CPC ................ *H02J 9/065* (2013.01); *H02J 7/44* (2026.01); *H02J 7/82* (2026.01); *H02J 7/933* (2026.01)

(58) Field of Classification Search

None

See application file for complete search history.

(56) References Cited

U.S. PATENT DOCUMENTS

| | | | | |
|---|---|---|---|---|
| 8,258,705 | B2 * | 9/2012 | Butteris | H05B 45/10 307/64 |
| 9,999,108 | B2 | 6/2018 | Rezeanu et al. | |
| 10,404,096 | B2 | 9/2019 | Sabnis et al. | |
| 12,176,753 | B2 * | 12/2024 | De Menezes | H05B 47/105 |
| 2008/0296975 | A1 * | 12/2008 | Shakespeare | H02J 9/065 307/66 |
| 2013/0328402 | A1 * | 12/2013 | Noguchi | H05B 47/105 307/66 |
| 2024/0302009 | A1 * | 9/2024 | Lu | H02J 7/0048 |
| 2025/0183703 | A1 * | 6/2025 | Tsai | H05B 45/38 |

* cited by examiner

*Primary Examiner* — Kenneth B Wells
(74) *Attorney, Agent, or Firm* — Secant IP, PLLC

(57) ABSTRACT

The present disclosure provides an emergency lighting system that includes battery charging circuitry to charge a rechargeable battery based on available AC power; and emergency power level control circuitry configured to detect a power outage of the AC power and determine an available output capacity (ACP) of the battery based on a normalized output capacity of the battery; the emergency power level control circuitry is further configured to determine a lighting protocol to deliver a foldback power level of the emergency power level control circuitry, the lighting protocol being based on determining if ACP is less than a selected value; wherein the foldback power having a first power level Preduced, where Preduced is less than FRP, delivered for a first time period, a second ramped down power level delivered for a ramp down time period tramp, and a third minimum power level Pmin delivered for a third time period.

21 Claims, 9 Drawing Sheets

EMERGENCY LIGHTING SYSTEM

TECHNICAL FIELD

The present disclosure is generally directed to an emergency lighting system, and, more particularly, to an emergency lighting system with controlled power output.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

Figure 1:
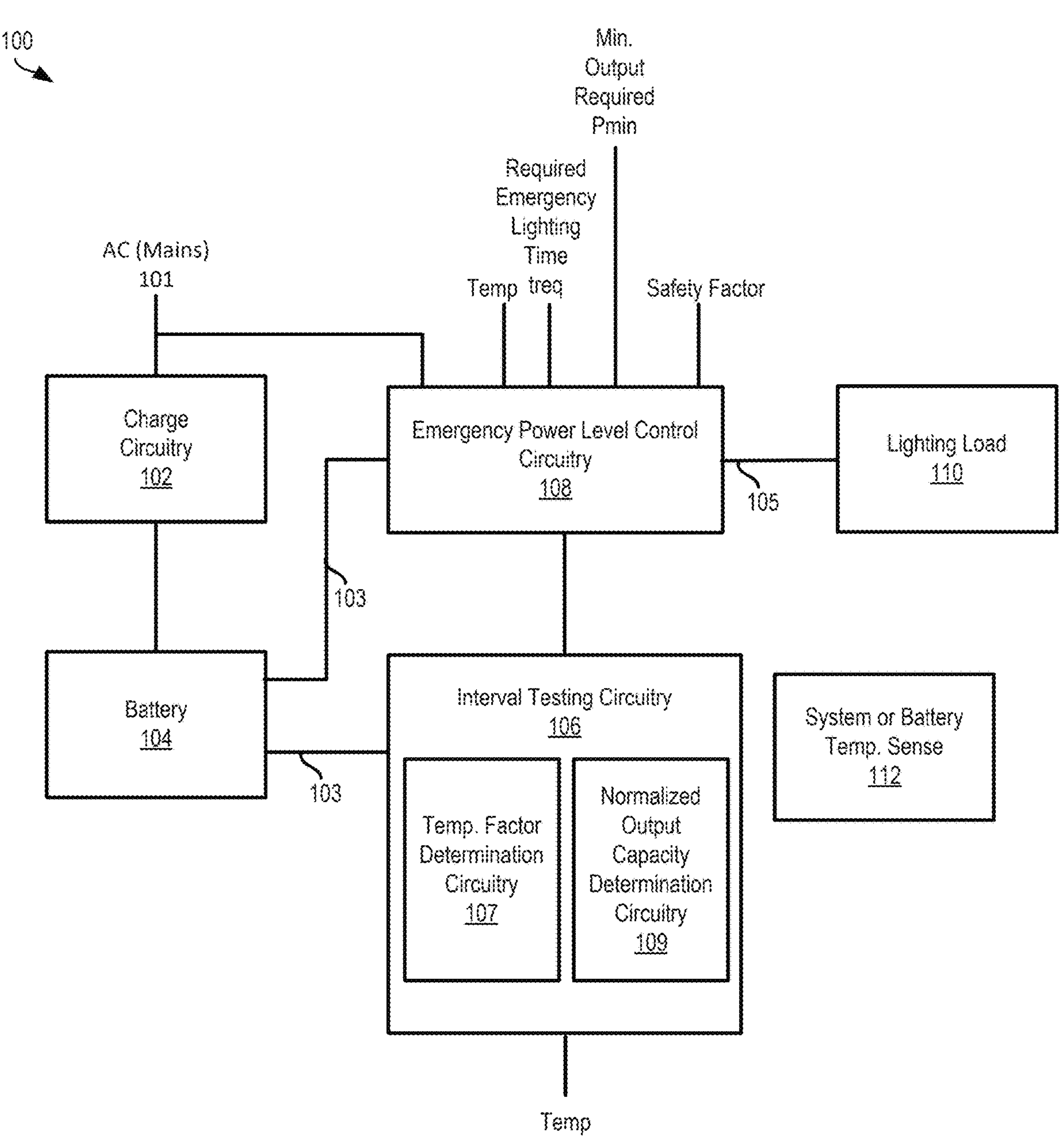
FIG. 1 illustrates an emergency lighting system according to embodiments of the present disclosure.

FIG. 1 illustrates an emergency lighting system 100 according to embodiments of the present disclosure. The lighting system 100 generally includes battery charge circuitry 102 generally configured to charge a battery 104 using an AC power source 101 (e.g., main AC power). The charge/discharge circuitry 102 may include any known and/or after-developed charging circuits, for example, current controlled charging circuits, narrow voltage DC charging circuits, hybrid power boost charging circuits, etc. The battery 104 is generally a rechargeable-type battery that may include any type of known and/or after-developed battery type, for example, nickel-metal-hydride (NiMH), nickel cadmium (NiCd), lithium ion, (Li-ion), lead acid (PbA), etc.

As a general matter, the system 100 illustrated in FIG. 1 may be embodied as an emergency lighting "unit" that is deployed, for example, inside of a building, outside of a building, etc. As will be appreciated by those skilled in the art, the lighting system 100 may include transformer circuitry and/or AC/DC converter circuitry (not shown) to provide appropriate power levels for charging. The lighting load 110 may include any known and/or after-developed lighting technologies, for example, light emitting diode (LED) bulbs, LED arrays, conventional incandescent lighting, etc., and may further be embodied in a directional housing to enable the lighting to be focused at a particular location (e.g., along a hallway/path, at an exit door, etc.). In addition, the lighting load 110 may be embodied as any color variety, which may be selected based on, for example, building code requirements, federal laws, etc. The system 100 also includes temperature sensing circuitry 112 generally configured to determine a temperature of the controller 108 and/or battery 104 and/or ambient temperature, and to generate a signal indicative of, or proportional to, such temperature.

The system 100 also includes interval testing circuitry 106 configured to determine certain output characteristics at selected intervals, for example, yearly testing as may be required by law and/or building codes, etc., and/or user-defined intervals to generally obtain operating performance information of the system 100, as described in greater detail below. The system 100 also includes emergency power level control circuitry 108 ("controller 108") generally configured to supply a selected power level from the battery 104 to the lighting load 110 in the event of a power outage and/or other emergency (e.g., fire, etc.) where emergency, battery-operated lighting is required. The controller 108 is configured to discharge the battery 104, and is selected to have a power output 105 based on the charge capabilities of the battery 104 (e.g., W*Hr rating of the battery 104, etc.) and the power requirements of the lighting load 110. For example, the controller 108 may be rated to deliver 10 Watts at full rated power (FRP) (of course, this is only one example, and the rated output of the controller 108 can be any value (e.g., 5 Watts, 12 Watts, 15 Watts, etc.) depending on the particulars of the battery 104 and the load 110, "overhead" requirements, etc.).

As will be described in greater detail below, the controller 108 is generally configured to determine a power outage (i.e., discontinuity of main AC power 101) and to select an emergency lighting protocol to deliver power 105 to the lighting load 110 based on known (normalized) output capacity of the battery 104, temperature information, and a required time to provide lighting (treq). In embodiments described herein, the emergency lighting protocol is selected from among a first lighting protocol to deliver a constant power that is 100% of the FRP of controller 108 (Pmax) for a required total time of emergency lighting (treq), a second lighting protocol to deliver a constant reduced power (Preduced) for the required total time of emergency lighting (treq), and a third lighting protocol (also referred to herein as "foldback") in which Preduced is delivered for a first time period (X), then the output power is ramped down to a required minimum output power (Pmin) over a ramp down period (tramp), then Pmin is delivered to the load 110 for the remainer of the required time interval (treq). By selecting the lighting protocol based on battery capacity information and temperature, the teachings of the present disclosure provide enhanced safety and operational longevity of battery-operated emergency lighting systems.

The values of Pmax, Preduced and treq may be selected, for example, based on operational parameters of the system 100, battery capacity as the battery 104 ages, etc., In some embodiments, the values of Pmax, Preduced, Pmin, and treq are selected based on requirements established by law/building codes, etc. For example, some building codes may require that the time interval of emergency lighting, treq, may be 90 minutes, and the allowable reduction in power (Preduced) delivered to the lighting load 110 may be approximately 92% of the FRP of controller 108. Preduced may be selected because the charge capacity of the battery 104 is diminished due to aging, temperature, etc., as described below.

Figure 2A:
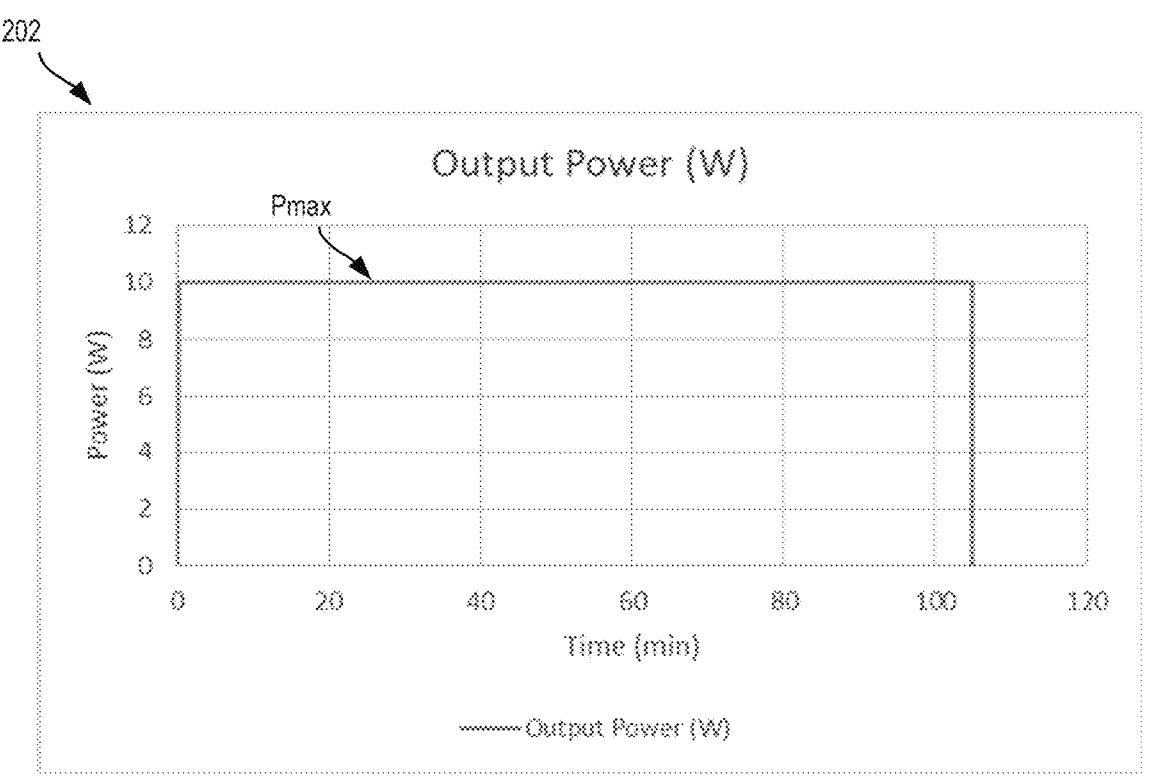
FIG. 2A illustrates an example plot of output power as a function of time, delivered by a controller using a first lighting protocol.
Figure 2B:
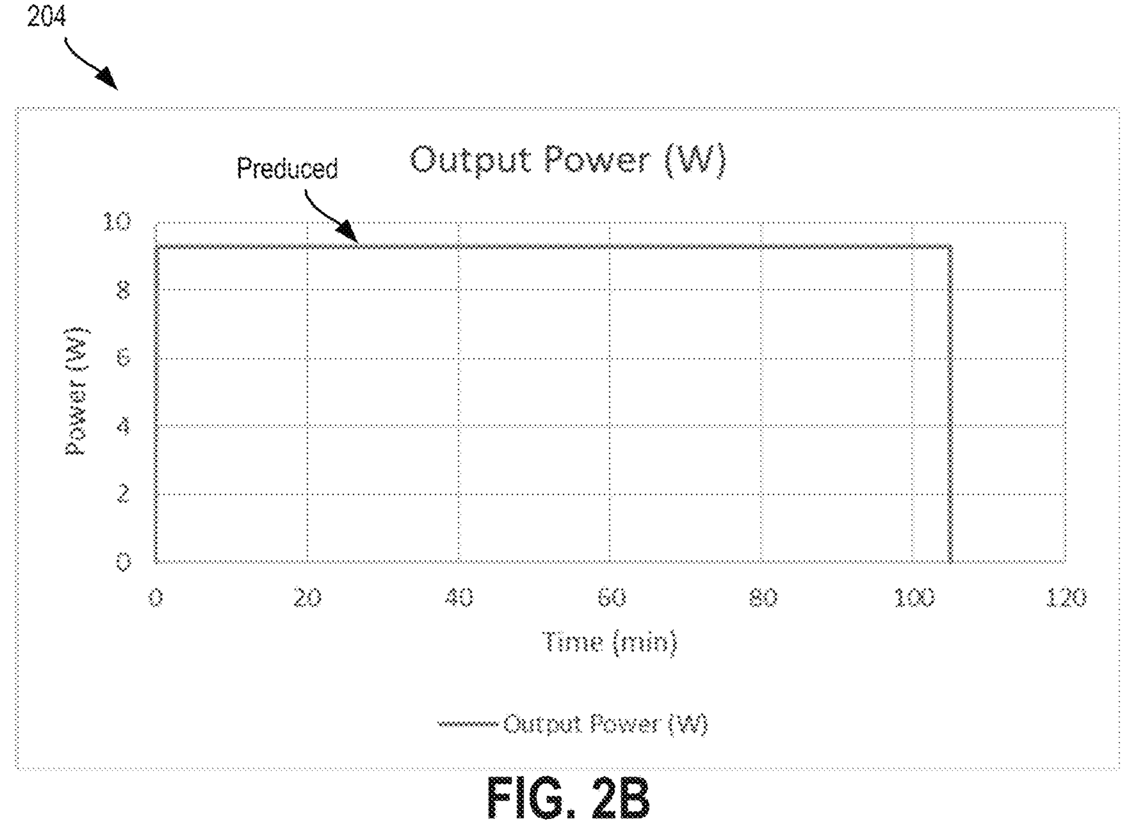
FIG. 2B illustrates an example plot of output power as a function of time, delivered by the controller using a second lighting protocol.

These lighting protocol concepts according to embodiments of the present disclosure are illustrated in FIGS. 2A-2D. FIG. 2A illustrates an example plot 202 of output power as a function of time, delivered by controller 108 using the first lighting protocol. In this example, the FRP of controller 108 is 10 Watts, thus Pmax is 10 Watts. Plot 202 illustrates Pmax being delivered to the lighting load for approximately 105 minutes. In this case, treq is less than 105 minutes (for example, treq=90 minutes). In this case, and as will be described in detail below, controller 108 determines that the battery 104 is capable of delivering the FRP of controller 108 for the full duration of treq at a given temperature. FIG. 2B illustrates an example plot 204 of output power as a function of time, delivered by controller 108 using the second lighting protocol. In this example, the FRP of controller 108 is 10 Watts, and controller 108 determines that the battery 104 is not capable of delivering Pmax to the load 110, but the battery 104 has sufficient charge to deliver Preduced to the load 110 for the duration of treq at a given temperature. In this example Preduced is approximately 92% of the FRP of controller 108, and represents approximately 9.2 Watts of power delivered to the load 110.

Figure 2C:
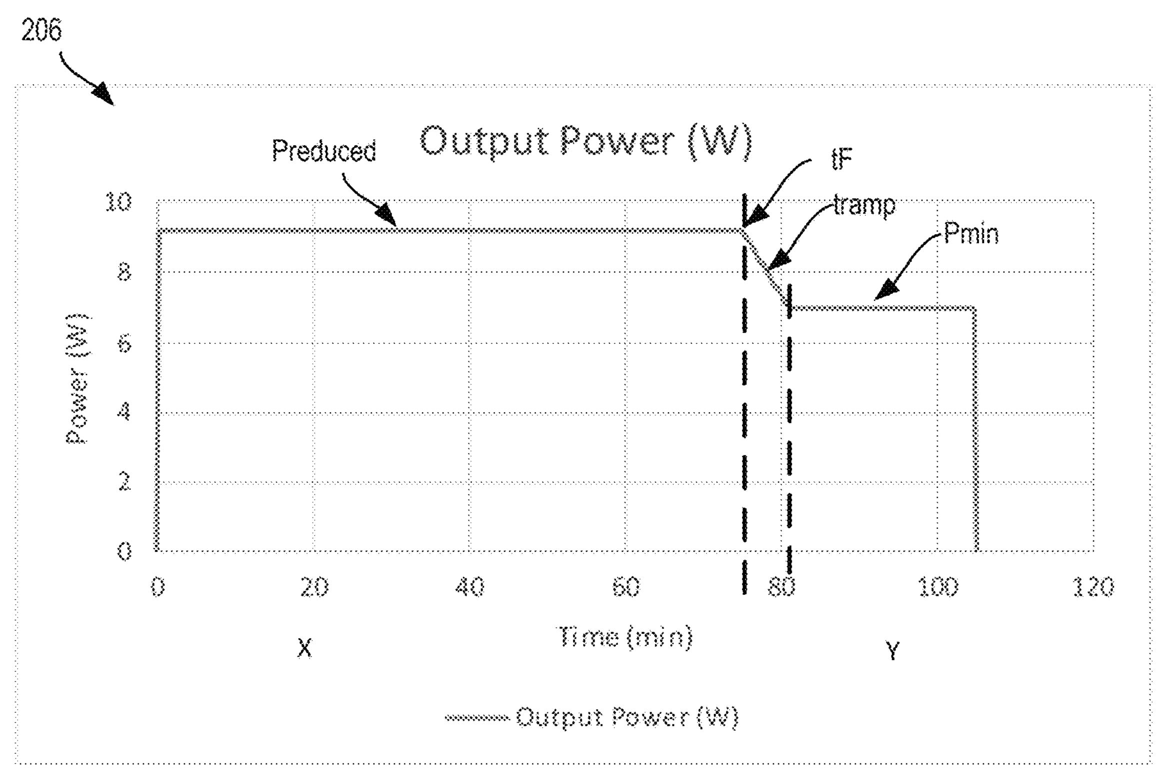
FIG. 2C illustrates an example plot of output power as a function of time, delivered by the controller using an example of a third lighting protocol.
Figure 2D:
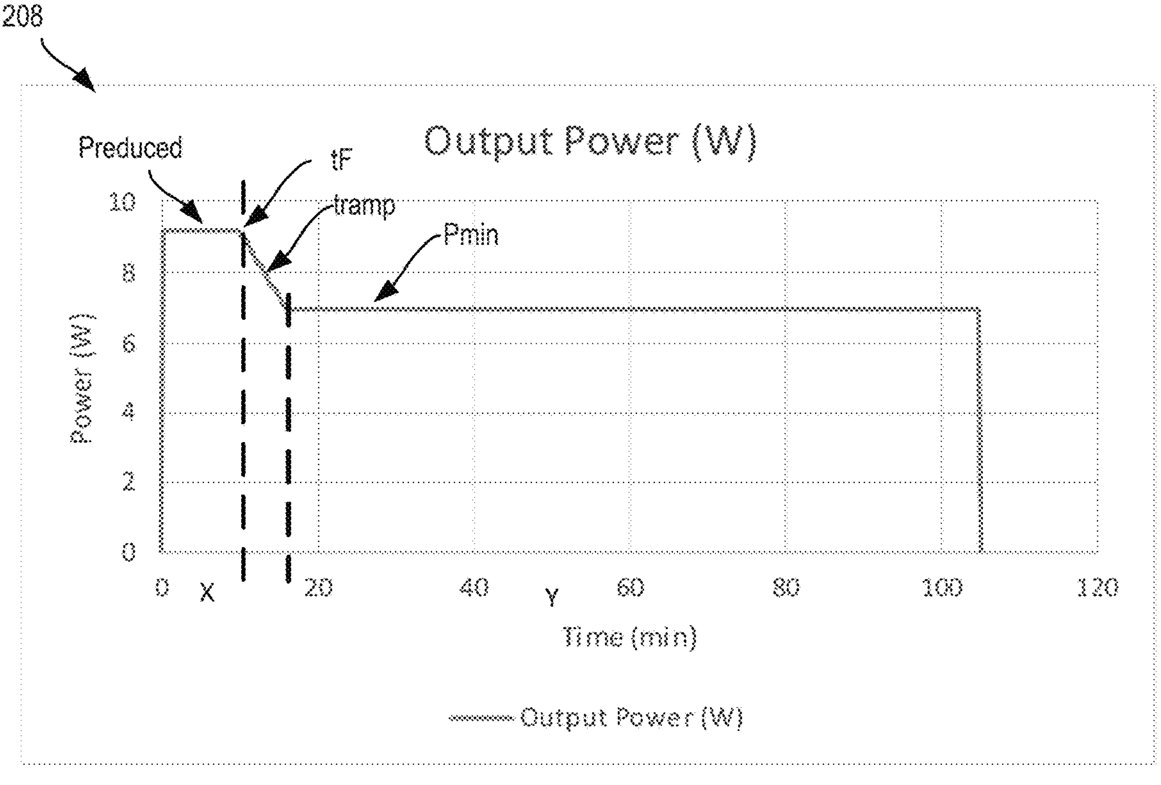
FIG. 2D illustrates an example plot of output power as a function of time, delivered by the controller using another example of the third lighting protocol.

FIGS. 2C and 2D illustrate examples of power delivery using the "foldback" protocol. FIG. 2C illustrates an example plot 206 of output power as a function of time, delivered by the controller 108 using an example of the third lighting protocol. In the example plot 206 of FIG. 2C, the FRP of controller 108 is 10 Watts, and controller 108 determines that the battery 104 is not capable of delivering Pmax to the load 110, and the controller 108 determines that the battery 104 has insufficient charge to deliver Preduced to the load 110 for the duration of treq at a given temperature. Accordingly, the controller 108 determines a first time duration (X) during which Preduced can be delivered to the load 110, a foldback time (tF) to start a ramp down of power, a ramp down time period (tramp) during which power is reduced from Preduced to Pmin, and a duration time (Y) to deliver Pmin to the load 110. As a general matter, Pmin represents a minimum required power delivered to the lighting load 110 during an emergency lighting situation, for example, as may be required by law and/or building code, etc. In this example, Pmin is approximately 70% of the FRP of controller 108, thus during time period Y, approximately 7 Watts is delivered to the load 110. As is illustrated in FIG. 2C, the foldback time, tF, is approximately 75 minutes, and the ramp down time, tramp, is approximately 6 minutes. The selection of tramp may be based on, for example, providing emergency lighting with stepped-down power changes that are minimally perceivable by humans exposed to the lighting (as opposed to an abrupt step down in power). FIG. 2D illustrates an example plot 208 of output power as a function of time, delivered by the controller 108 using another example of the third lighting protocol. The example plot 208 of FIG. 2D is similar to FIG. 2C, except that the battery 104 is generally further degraded (and/or the conditions in FIG. 2D represent lower temperatures than FIG. 2C) and can only deliver Preduced for a much shorter time period X (approximately 10 minutes, instead of 75 minutes of FIG. 2C).

Figure 3:
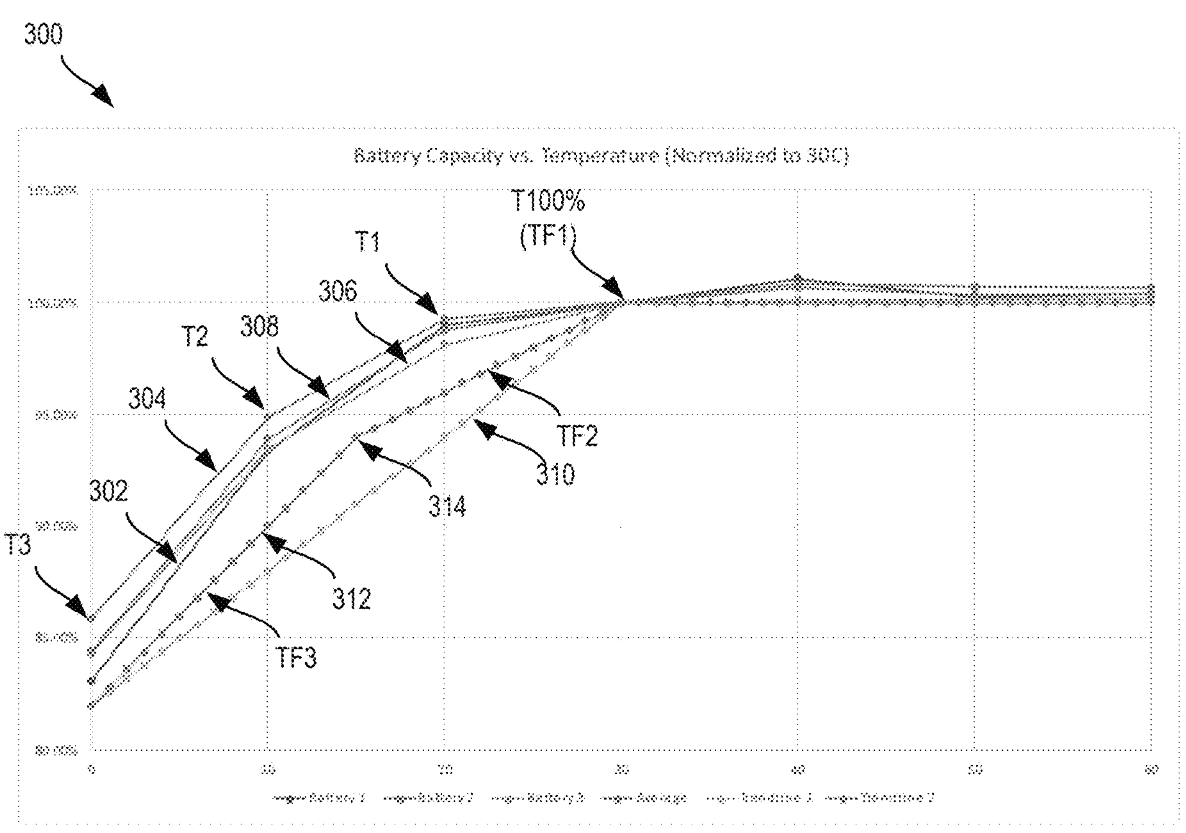
FIG. 3 illustrates example test data of battery power performance plots as a function of temperature (T)

Referring again to FIG. 1, and as noted above, controller 108 selects a lighting protocol based on known battery conditions and temperature. Accordingly, in some embodiments, the interval testing circuitry 106 includes temperature factor determination circuitry 107 generally configured to generate one or more temperature factors associated with the battery 104. A "temperature factor", as used herein, represents a weighting of the output capacity of the battery 104 as a function of temperature. With continued reference to FIG. 1, FIG. 3 illustrates example test data of battery capacity performance plots 300 as a function of temperature (T). The plots in FIG. 3 illustrate the temperature performance of three example batteries, Battery 1 (plot 302), Battery 2 (plot 304), and Battery 3 (plot 306), an average power output plot 308 of the three batteries, and trendlines (trendline 1 (plot 310), trendline 2 (plot 312)) each representing a piecewise linear approximation of the average of the four temperature measurements T100%, T1, T2 and T3 of the average of the three batteries. As is known, the ability of most battery types to deliver power degrades at lower temperatures, as is generally illustrated in the plots 300 of FIG. 3, where maximum power output of the batteries occurs at approximately 30 degrees Celsius. The three batteries are tested to generate the capacity output plots as shown, and generally represent three similar types of batteries that may be used as the rechargeable battery 104 in the system 100 of FIG. 1. In other words, Battery 1, Battery 2, and Battery 3 may represent the same or similar class and/or type of battery as battery 104, and are used to generate temperature factors as described below.

With continued reference to FIG. 3, trendline 1 310 represents an interpolation of the average curve 308 using T100% and T3. Trendline 2 312 represents an interpolation of the average curve 308 using T100%, and T3, with a midpoint at approximately 15 degrees Celsius. Thus, Trendline 2 may be considered a more accurate representation of the power profile (as a function of temperature) of the test batteries, as compared to trendline 1. Of course, in other embodiments, and depending on a desired accuracy of the trendline and overall nature of the trend curve, a plurality of temperature sample points may be used (for example, every degree Celsius, every 2 degrees Celsius, etc.), which may generate a more accurate representation of the average curve 308. While T100%, T1, T2, and T3 are represented as temperature points ranging from 30 degrees Celsius to 0 degrees Celsius, other temperature ranges may be used, depending on, for example, an anticipated operating environment for the emergency lighting system 100 (e.g., indoor vs. outdoor deployment of the lighting system 100, other battery types that generally have other power profiles, etc.). By way of example, the following description of determining temperature factors is in reference to using trendline 2 312.

Figure 4:
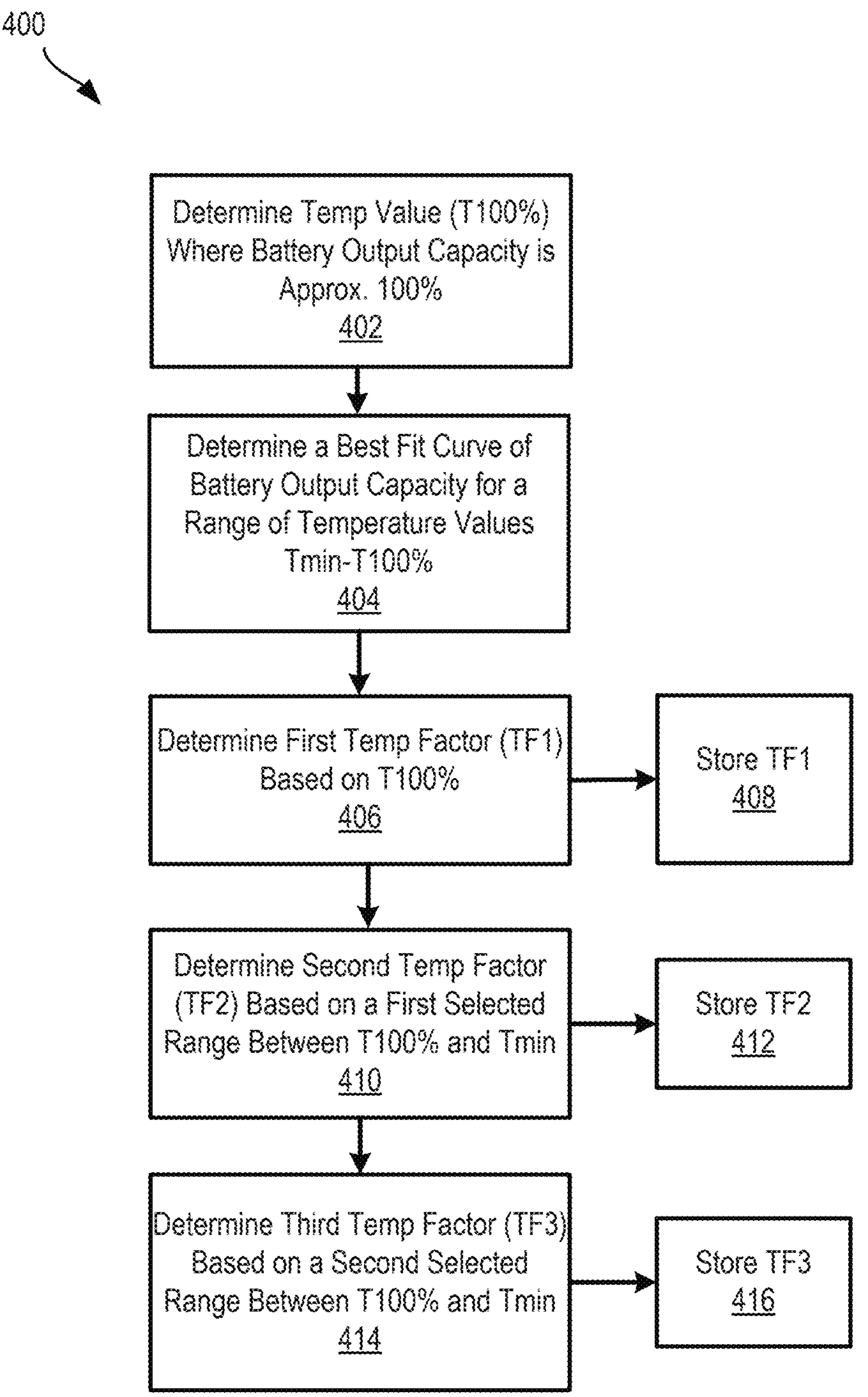
FIG. 4 is a flowchart of operations according to one embodiment.

FIG. 4 is a flowchart 400 of operations according to one embodiment. In particular, FIG. 4 is a flowchart 400 of operations of the temperature factor determination circuitry 107 to determine temperature factors associated with the battery 104. With continued reference to FIG. 3, operations of the temperature factor determination circuitry 107 include determining a temperature value where battery output capacity is approximately the maximum output capacity of the battery (T100%) 402. Determining T100% may be derived experimentally (using a plurality of test batteries, as shown in FIG. 3) and/or represents a known value for a given battery or battery type (e.g., supplied by the battery manufacturer, etc.). Operations also include determining a best fit curve of battery output capacity values over a selected range of temperature values, Tmin-T100% 404. In the example of FIG. 3, Tmin is approximately 0 degrees Celsius and T100% is approximately 30 degrees Celsius, and the best fit curve (Trendline 2) is derived from the four test temperatures T100%, T1, T2 and T3.

Operations of the embodiment of FIG. 4 also include determining a first temperature factor (TF1) based on the maximum output capacity temperature T100% 406. By way of example, a first temperature factor of 1 (TF1=1) may be used when the battery temperature is equal to or greater than 30 degrees Celsius. The value of TF1 may be stored 408, for example in a storage medium (e.g., memory, etc., not shown) associated with the interval testing circuitry 106. As shown by trendline 2 (312, FIG. 3), the midpoint between T100% and T3 is represented at approximately 15 degrees Celsius, shown at point 314 in FIG. 3. Accordingly, operations of this embodiment also include determining a second temperature factor (TF2) based on a first selected temperature range between Tmin and T100% 410. In the example of FIG. 3, and using trendline 2, the midpoint between T100% and T3 is approximately 15 degrees Celsius. Accordingly, TF2 represents the temperature factor for temperatures greater than or equal to 15 degrees Celsius and less than 30 degrees Celsius. In this embodiment, TF2 is determined by Equation 1 below:

$$TF2=((0.06/15)*(\text{temperature}-15))+0.94. \qquad \text{(Eq. 1)}$$

Using the trendline 2 plot of FIG. 3 as an example, the value of 0.06 in Eq. 1 represents the percentage rise (or fall) (converted to a decimal) from T100% to point 314 (15 deg C.), and the value of 15 in Eq. 1 represents the delta in temperature between T100% and 15C. Thus, Eq. 1 provides the slope of Trendline 2 between the 15 degrees C. and 30 degrees C. points. The 0.94 represents the battery output as a percentage from the 100% value at the 15 degrees C. point.

The value of TF2 may be stored 412, for example in a storage medium (e.g., memory, etc., not shown) associated with the interval testing circuitry 106.

Operations of this embodiment also include determining a third temperature factor (TF3) based on a second selected temperature range between Tmin and T100% 414. In this embodiment, TF3 is a temperature factor for temperatures less than 15 degrees Celsius. In this embodiment, TF3 is determined by Equation 2 below:

$$TF3=((0.12/15)*(\text{temperature}))+0.82. \qquad \text{(Eq. 2)}$$

Similar to Eq. 1, described above, the 0.12 value represents the percentage of falloff converted to a decimal between 15 and 0° C., and the 15 represents the delta in temperature between 0 degrees C. and 15 degrees C., and the 0.82 value is the offset at OC for the slope equation (i.e., y=mx+b).

The value of TF3 may be stored 416, for example in a storage medium (e.g., memory, etc., not shown) associated with the interval testing circuitry 106.

While the foregoing example describes generating three temperature factor values TF1, TF2, and TF3, it should be understood that the foregoing is provided only as an example. In other embodiments, additional temperature factor values may be obtained, for example, by delineating a finer granularity of selected temperature ranges for the temperature factor values by testing the batteries at additional temperature points, etc. It should be noted that in other embodiments, instead of storing the temperature factor values, the equations for determining the temperature factor values may be stored and executed upon an occurrence of an emergency lighting event (described below). The temperature factor values according to the teachings of the present disclosure are generally provided as an estimate of battery performance over a selected range of temperature values, and of course, a more accurate estimation of battery performance may be realized with a greater number of sampled test points. In addition, while three batteries are used for generating test data in the Example of FIG. 3, it should be understood that any number of batteries may be used, and indeed, such experiments may include a variety of battery types and/or classes.

With continued reference to FIG. 1, and to determine performance metrics of the battery 104, the interval testing circuitry 106 also includes normalized output capacity determination circuitry 109 generally configured to periodically determine the output capacity of the battery 104 based on a selected test protocol and the temperature at the onset of the test. As a general matter, the selected test protocol may be performed at required intervals (e.g., yearly) and/or user-defined intervals. The selected test protocol generally determines if the battery 104 can deliver sufficient power to the lighting load 110, as may be required by law/building codes, etc. According to some requirements, the battery 104 must have sufficient power to enable the controller 108 to deliver a short duration of FRP of the controller 108 and a longer duration of a required minimum power, Pmin, for a total required time duration (treq).

Figure 5:
FIG. 5 illustrates a power profile plot of an example test protocol according to one example embodiment of the present disclosure.
Figure 5:
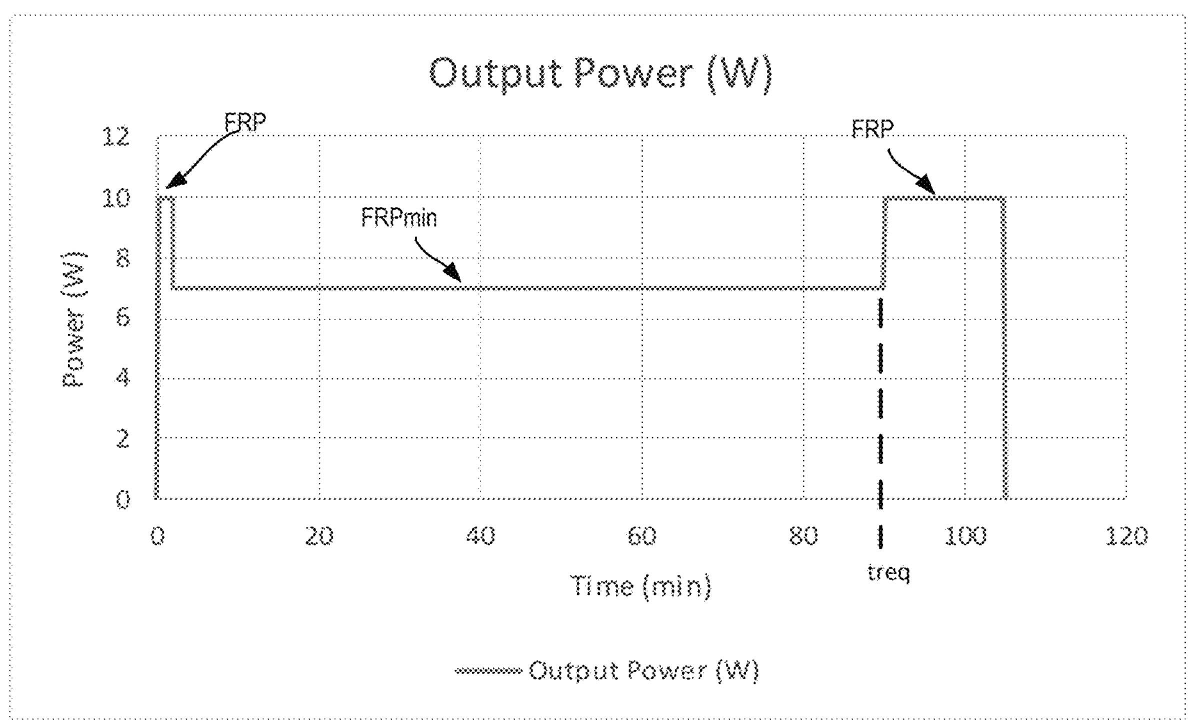

FIG. 5 illustrates a power profile plot 100 of an example test protocol according to one example embodiment of the present disclosure. As illustrated, the battery controller 108 discharges the battery to the load 110 at FRP of the controller 108 for approximately 2 minutes to deliver maximum power (Pmax) to the load 110. The controller 108 then drops to a selected minimum output FRPmin to deliver a minimum power (Pmin) to the load 110 for a required time interval (treq). In this example, FRPmin is approximately 70% of FRP and treq is approximately 90 minutes. The controller 108 then resumes FRP output (Pmax) until the battery 104 is depleted or the battery 104 can no longer drive controller 108. In this example, the battery 104 is depleted at approximately 105 minutes. The total output power of the battery 104 is generally represented as the area under the curve of power output. Of course, the test protocol illustrated in FIG. 5 is provided only as an example, and in other embodiments, other test protocols may be used having different requirements for Pmax, Pmin, treq, etc.

Figure 6:
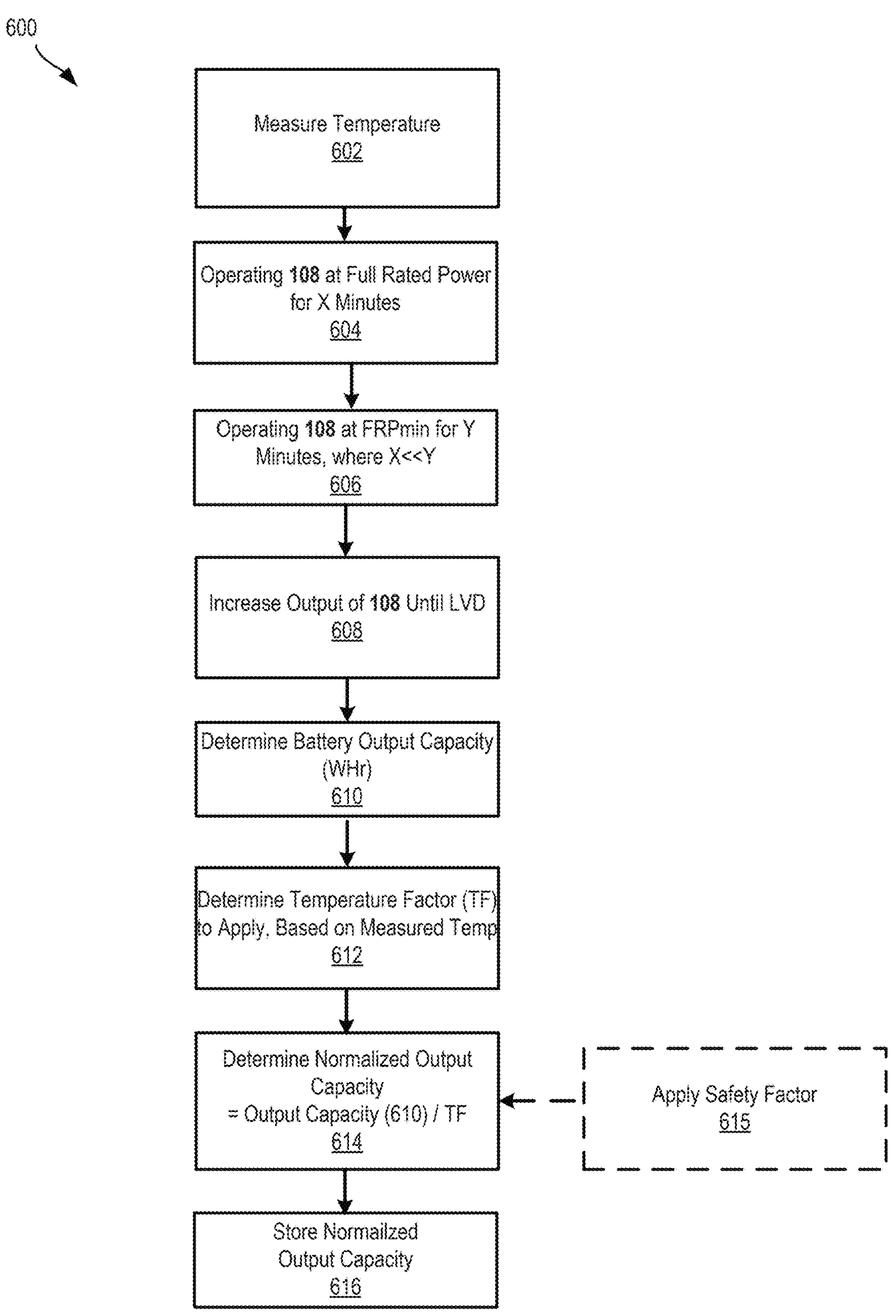
FIG. 6 illustrates a flowchart of example operations of the normalized output capacity determination circuitry to determine a normalized output capacity of the battery according to one embodiment of the present disclosure.

Using the example test protocol of FIG. 5, FIG. 6 illustrates a flowchart 600 of example operations of the normalized output capacity determination circuitry 109 to determine a normalized output capacity of the battery 104 according to one embodiment of the present disclosure. Operations of this embodiment include measuring the temperature (T) 602. Operations also include operating a controller (e.g., controller 108) at full rated power (FRP) for X minutes 604. Operations also include operating controller 108 at a minimum power, Pmin, for Y minutes 606. As a general matter, the time periods X+Y represent a required minimum time of operation for a lighting load (e.g., X+Y=90 minutes). In some embodiments, X<<Y. Operations of this embodiment may further include increasing the operation of controller 108 to FRP until the battery can no longer supply power to the load (LVD) 608. In some embodiments, to determine the LVD time point, the output of the controller may be sampled at selected sampling intervals (ss), for example, every 10 seconds. Further, in some embodiments, and as described below, if the battery and/or controller is unable to meet the required outputs for the required duration, a warning signal may be generated to notify personnel of a fault in the emergency lighting system.

Based on the operations described above, operations of this embodiment also include determining an output capacity 610. Generally, the output capacity (expressed in Watt Hours (WHr)) is determined using Equation 3 below:

$$\text{Output Capacity}=FRP(\text{of controller 108})*(X/60)Hr+FRP\ \min*((\text{treq}-X)/60)Hr+FRP((ss/6)/60)Hr \quad \text{(Eq. 3)}$$

Operations of this embodiment also include determining a temperature factor (TF) to apply based on the measured temperature 312. The temperature factor is determined as described above with reference to FIGS. 3 and 4. Operations of this embodiment also include determining a normalized output capacity 614, based on the output capacity (Eq. 3) and the determined temperature factor for a given temperature. Generally, the normalized output capacity (expressed in Watt Hours (WHr)) is determined using Equation 4 below:

$$\text{Normalized Output Capacity}=\text{Output Capacity(Eq. 3)/Temperature Factor.} \quad \text{(Eq. 4)}$$

In some embodiments, and to provide a "safety margin" of the operation of the emergency lighting system, the actual output capacity (Eq. 3) may be reduced by a safety factor (e.g., 5%, or 0.95*output capacity) 615. In such embodiments, the normalized output capacity (expressed in Watt Hours (WHr)) is determined using Equation 5 below:

$$\text{Normalized Output Capacity}=\text{Safety Factor*Output Capacity(Eq. 3)/Temperature Factor.} \quad \text{(Eq. 5)}$$

The normalized battery output capacity may be stored 616, for example in a storage medium (e.g., memory, etc., not shown) associated with the interval testing circuitry 106.

Figure 7:
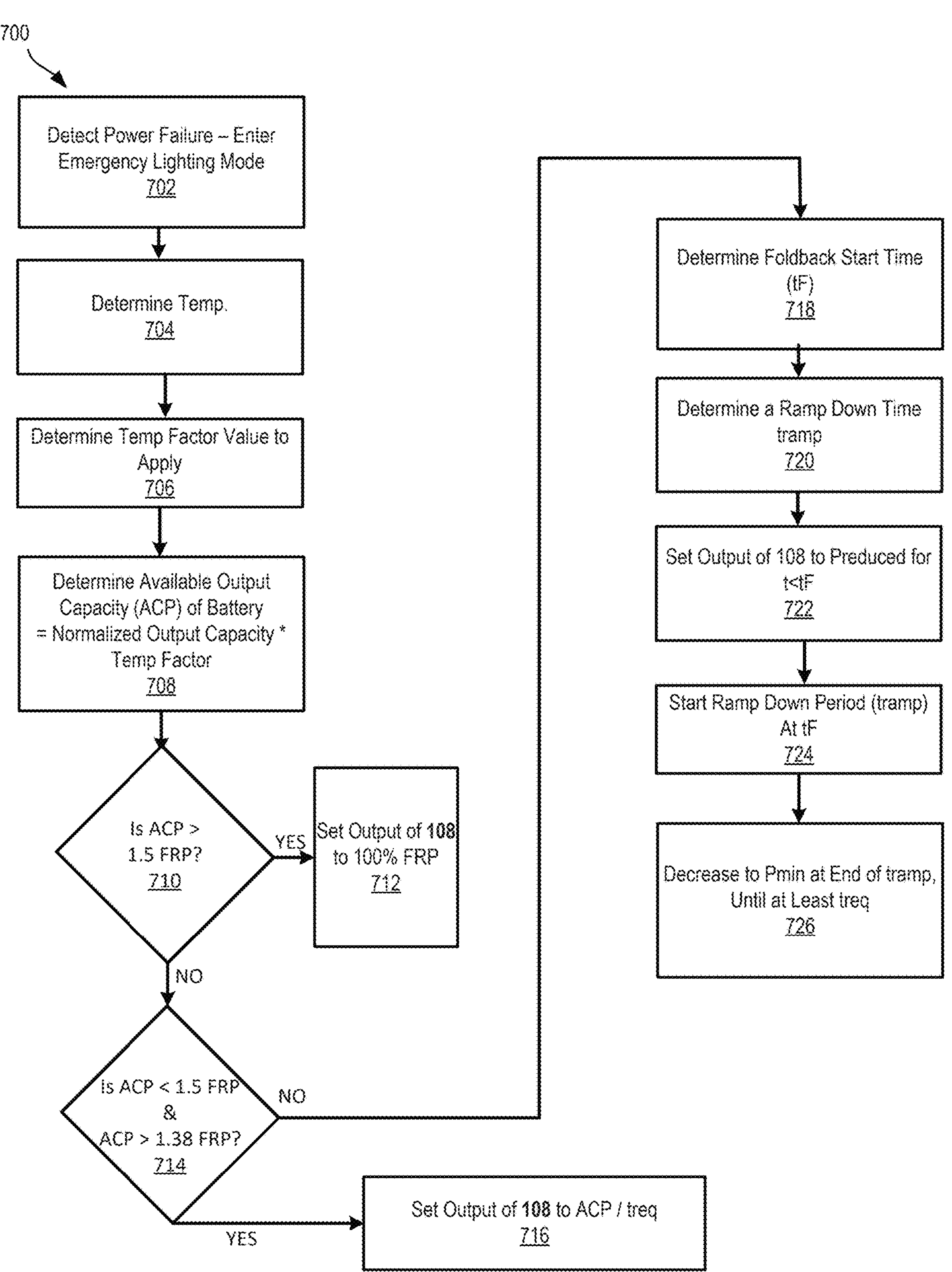
FIG. 7 illustrates a flowchart of example operations of selecting an emergency lighting protocol according to one embodiment of the present disclosure.

With continued reference to FIG. 1, the controller 108 is configured to select one of the first, second or third emergency lighting protocols, based on the temperature factor and the normalized output capacity to deliver power 105 to the lighting load 110, as described below. FIG. 7 illustrates a flowchart 700 of example operations of selecting an emergency lighting protocol according to one embodiment of the present disclosure. Operations of this embodiment include detecting a power failure, and entering into an emergency lighting mode 702. Operations further include determining a temperature of a battery, a controller and/or ambient temperature 704. Operations further include determining a temperature factor (TF) value to apply, based on the temperature 706. Operations further include determining an available output capacity (ACP) of the battery 708; where ACP=normalized output capacity*TF. Operations of this embodiment also include determining if ACP>1.5*FRP (full rated power of a controller delivering power to a lighting load 710. In this example, the value of 1.5 represents the time in hours, which equates to the 90 minutes minimum run time, as may be required by regulatory agency codes, etc., If ACP>1.5*FRP, operations of this embodiment also include setting an output of a controller to 100% FRP 712, and delivering maximum power to the lighting load for a minimum required time treq. If ACP<1.5*FRP, operations of this embodiment also include determining if ACP>1.38*FRP 714. In this example, the value of 1.38 represents being able to run the light at 92% of FRP for 1.5 hours (0.92*1.5=1.38). If ACP<1.5*FRP and ACP>1.38*FRP, operations also include setting an output of the controller to ACP/treq 716, to deliver a reduced power to the lighting load for a minimum required time treq.

If ACP<1.38*FRP (714), operations of this embodiment further include determining a foldback start time (tF) 718. Generally, tF is determined using Equation 6 below:

$$ACP=[(0.92)*tF)+((0.5*(0.92-0.7)*0.1)+(0.7*0.1))+(0.7*(1.4-tF))]*FRP \quad \text{Eq. 6;}$$

where the value of 0.92 represents the reduced power level at the start of the discharge (92% of FRP), the value of 0.7 represents the Pmin 70% of FRP, the value of 0.1 represents the 6 minute interval for the ramp time (0.1 hour), and the value of 1.4 represents the remainder of the minimum 1.5 hour run time (subtracting the 6 minute ramp time). Note that Eq. 6 generally represents the area under the curve, and thus, the value of 0.5 is used for determining the triangular area under the curve during the foldback 6 minute period (e.g., A=0.5 bh).

Rearranging Eq. 6 for tF:

$$tF=((ACP/FRP)-1.061)/0.22$$

Operations of this embodiment also include determining a ramp down time, tramp, that begins at tF 720. In one example, tramp may be on the order of 6 minutes so that the decrease in light output is less perceptible. Operations of this embodiment also include setting the output of controller 108 to a reduced power output, Preduced, for the time period t<tF 722. Operations also include dropping the power over the tramp period, starting at tF, to Pmin (724), and continuing delivering Pmin power for at least the required time period treq. The power profile of the foldback operations described above are depicted in the plots of FIGS. 2C and 2D.

Figure 8:
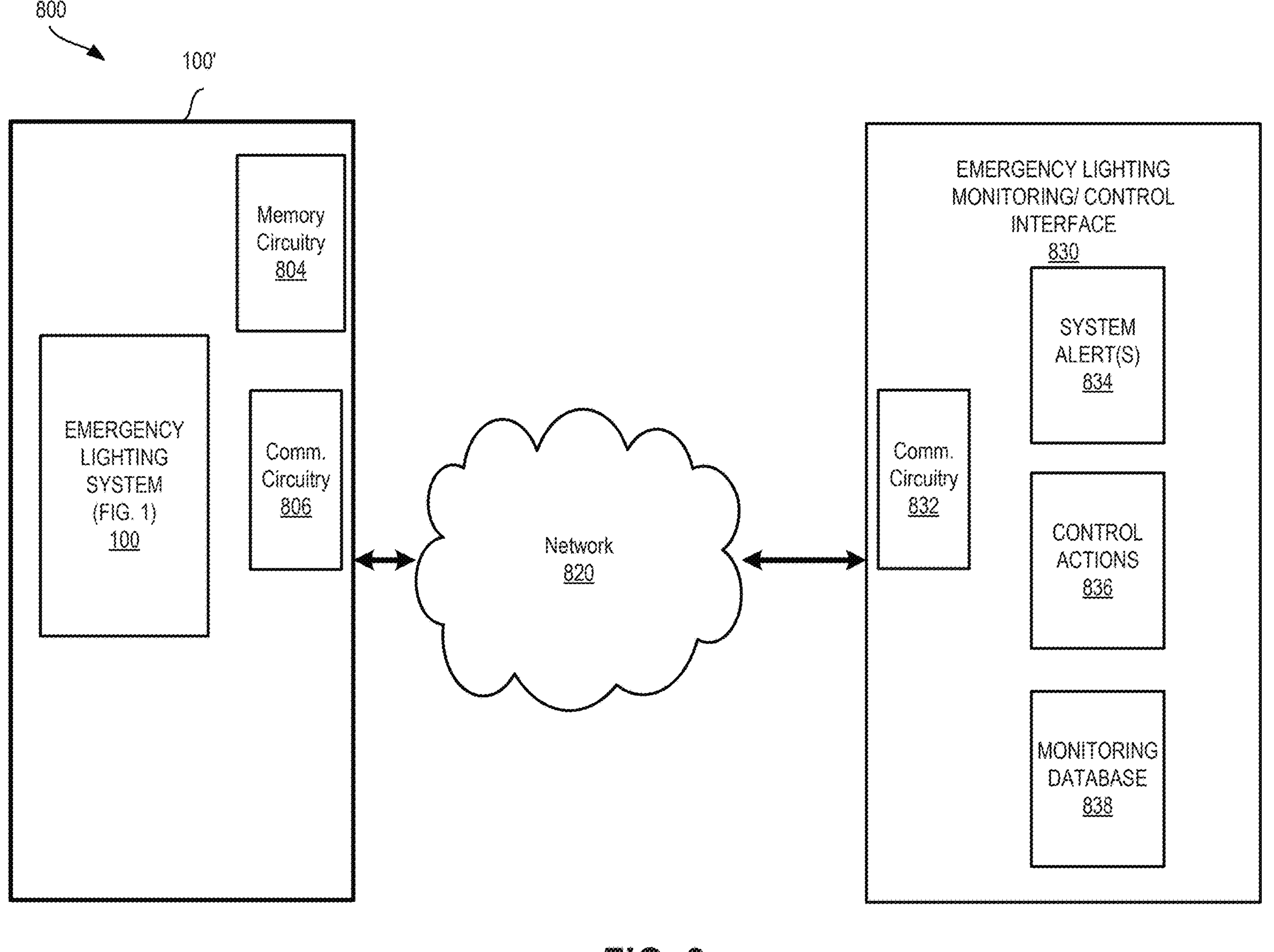
FIG. 8 illustrates an emergency lighting system according to another embodiment of the present disclosure.

FIG. 8 illustrates an emergency lighting system 800 according to another embodiment of the present disclosure. In this embodiment, the lighting system 100' includes the components of lighting system 100 (FIG. 1, described above) and further includes memory circuitry 802 and communications circuitry 806. The lighting system 100' of this embodiment includes communication circuitry 806 generally configured to exchange commands and data with a remote system (described below), via network 820. The communications circuitry 806 may communicate using a known and/or after-developed communications protocols including, for example, cellular communications protocols (e.g., LTE, 3G, 4G, 5G/6G, etc.), wireless network communications protocols (e.g., IEEE 10 BASE x, WiFi, etc.), etc. In some embodiments, for example, if the system 800 is deployed in a remote location outside of cellular/wifi coverage, communications circuitry 806 may be configured to communicate using satellite communications protocols, etc. Communications circuitry 806 may also include antennae systems (e.g., direction and/or polar antennae arrays, etc.) and/or signal boosting circuitry (not shown) to enable greater range of communications.

The lighting system 100' may also include memory circuitry 804 to store historical data concerning the state and status of various components (e.g., power status, operating voltage, operating frequency, system alert messages, component status messages, time/date stamp data, etc.), which may be transmitted to the remote interface 830 on a continuous and/or periodic basis to enable remote monitoring and control of over various components of the lighting system 100'.

The system 800 may also include a remote lighting monitoring/control interface 830 generally configured to exchange commands and data with the lighting system 100', receive messages and alerts from the lighting system 100', and to control various operational aspects of the lighting system 100'. In some embodiments, the interface 830 may be embodied as a smart phone device (e.g., iPhone, Galaxy, etc.) and/or smart tablet device (e.g., iPad, laptop computer, etc.), etc., that includes a display, communications circuitry, input circuitry (e.g., touch screen, keyboard, etc.). The interface 830 may include executable instructions and/or instruction sets, for example, in the form of an "app" or application, to perform the various task described herein. The interface may include communications circuitry 832 (similar in functionality to communications circuitry 806, described above) to exchange commands and data with the lighting system 100', via network 820.

The interface 830 may include system alert(s) code 834 generally configured to trigger an alert upon receipt of an alert message from the lighting system 100'. Examples of alert messages include available power, voltage and frequency operational modes, power failure alert message, component status messages, time/date stamp data, etc. The alert may include, for example, flashing lights, defined sound, vibration, generation of a text and/or email message, etc., so that a user is notified of the alert message. The interface 830 may also include control actions code 836 to generate one or more control commands to control various components of the lighting system 100'. Control commands may include, for example, setting Pmin, treq, tramp, and/or other operational parameters described above, retrieving historical data from memory 804, adjusting other settings or parameters of the lighting system 100', etc. The interface 830 may also include a monitoring database 838 to store historical data concerning the various parameters and operational status of components of the lighting system 100'.

While the foregoing describes operations relative to the output 105 of controller 108, the teachings of the present disclosure can also be applied to the output 103 of the battery 104. Thus, for example, FRP in the above equations could instead be changed to the maximum output of battery 104 (for example, by weighting with the efficiency of controller 108).

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

Any of the operations described herein may be implemented in a system that includes one or more non-transitory storage devices having stored therein, individually or in combination, instructions that when executed by circuitry perform the operations. Such instructions may embodied as, for example, machine code, and/or "higher level" implementations such as software programing, application (app) programming, etc. "Circuitry", as used in any embodiment herein, may comprise, for example, singly or in any combination, hardwired circuitry, programmable circuitry such as processors comprising one or more individual instruction processing cores, state machine circuitry, and/or firmware that stores instructions executed by programmable circuitry and/or future computing circuitry including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), application-specific integrated circuit (ASIC), programmable logic devices (PLD), digital signal processors (DSP), field programmable gate array (FPGA), logic gates, registers, semiconductor device, chips, microchips, chip sets, etc.

The storage device includes any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device. Also, it is intended that operations described herein may be distributed across a plurality of physical devices, such as processing structures at more than one different physical location.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed:

1. An emergency lighting system, comprising:

battery charging circuitry to charge a rechargeable battery based on available input power;

emergency power level control circuitry configured to detect a power outage of the input power and determine an available output capacity (ACP) of the battery based on a normalized output capacity of the battery; the emergency power level control circuitry being further configured to determine a lighting protocol to deliver a foldback power level of the emergency power level control circuitry, the lighting protocol being based on determining if ACP is less than a first selected value; wherein the foldback power has a first power level Preduced, where Preduced is less than a full rated power (FRP), delivered for a first time period, a second ramped down power level delivered for a ramp down time period tramp, and a third minimum power level Pmin delivered for a third time period;

temperature factor determination circuitry configured to determine one or more temperature factors of the battery; and normalized output capacity determination circuitry configured to determine a normalized output capacity of the battery based on a selected test protocol conducted at a determined temperature and a selected one of the one or more temperature factors;

wherein the normalized output capacity determination circuitry is further configured to determine a safety factor and modify the normalized output capacity using the safety factor; wherein the safety factor represents a weighting factor, on a battery output capacity, having a value less than 1.

2. The system of claim 1, wherein each temperature factor represents a power output performance of the battery for a selected range of temperatures; and wherein the emergency power level control circuitry is further configured to determine ACP based on a selected temperature factor.

3. The system of claim 2, wherein the emergency power level control circuitry is further configured to determine ACP as ACP=normalized output capacity*selected temperature factor.

4. The system of claim 1, wherein the emergency power level control circuitry is further configured to determine another lighting protocol to deliver a power level equivalent to the FRP of the emergency power level control circuitry, based on comparing the ACP to a second selected value.

5. The system of claim 1, wherein the emergency power level control circuitry is further configured to determine another lighting protocol to deliver a reduced power level of the emergency power level control circuitry (Preduced), based on determining if ACP is between a second selected value and the first selected value.

6. The system of claim 1, wherein the FRP of the emergency power level control circuitry is based on a capacity of the battery and a requirement of a lighting load coupled to the emergency power level control circuitry and the battery.

7. The system of claim 1, wherein the emergency power level control circuitry is further configured to determine a foldback start time, tF, based on ACP and FRP;

wherein tF occurs at the end of the first time period.

8. The system of claim 7, wherein the ramp down time period is selected to minimize perceived changes in lighting; and wherein the emergency power level control circuitry is configured to ramp down power from Preduced to Pmin over the ramp down time period, starting at tF.

9. The system of claim 1, wherein the selected test protocol comprises operating the emergency power level control circuitry at FRP to deliver power to a lighting load for X minutes; operating the emergency power level control circuitry to deliver Pmin to the lighting load for Y minutes, where $X \leq Y$; and increasing the power level of the emergency power level control circuitry to FRP for Z minutes, starting after Y minutes, until a low voltage disconnect event occurs; wherein the normalized output capacity determination circuitry is configured to determine a battery output capacity based on the power delivered during the X, Y and Z time periods; and wherein the normalized output capacity determination circuitry is configured to determine the normalized output capacity of the battery as: normalized output capacity=output capacity/selected temperature factor.

10. An emergency lighting system, comprising:

battery charging circuitry to charge a rechargeable battery based on available input power;

temperature factor determination circuitry configured to determine one or more temperature factors of the battery; wherein each temperature factor represents a power output performance of the battery for a selected range of temperatures;

normalized output capacity determination circuitry configured to determine a normalized output capacity of the battery based on a selected test protocol conducted at a determined temperature and a selected one of the one or more temperature factors; and emergency power level control circuitry configured to detect a power outage of the input power and determine a temperature at the time of the power outage; select a temperature factor, from among the one or more temperature factors, based on the determined temperature at the time of the power outage; and determine an available output capacity (ACP) of the battery based on the normalized output capacity and the selected temperature factor; wherein the emergency power level control circuitry is further configured to determine:

a first lighting protocol to deliver a power level equivalent to a full rated power (FRP) of the emergency power level control circuitry, the first lighting protocol being based on comparing the ACP to a first selected value;

a second lighting protocol to deliver a reduced power level of the emergency power level control circuitry (Preduced), the second lighting protocol being based on determining if ACP is between the first selected value and a second selected value; and a third lighting protocol to deliver a foldback power level of the emergency power level control circuitry, the third lighting protocol being based on determining if ACP is less than the second selected value; wherein the foldback power has a first power level Preduced, where Preduced is less than FRP, delivered for a first time period, a second ramped down power level delivered for a ramp down time period tramp, and a third minimum power level Pmin delivered for a third time period;

wherein the emergency power level control circuitry is configured to select from among the first, second or third lighting protocols based on the value of ACP; and wherein the normalized output capacity determination circuitry is further configured to determine a safety factor and modify the normalized output capacity using the safety factor; wherein the safety factor represents a weighting factor on the battery output capacity having a value less than 1.

11. The system of claim 10, wherein the FRP of the emergency power level control circuitry is based on a capacity of the battery and a requirement of a lighting load coupled to the emergency power level control circuitry and the battery.

12. The system of claim 10, wherein the emergency power level control circuitry is further configured to determine a foldback start time, tF, based on ACP and FRP; wherein tF occurs at the end of the first time period.

13. The system of claim 10, wherein the ramp down time period is selected to minimize perceived changes in lighting; and wherein the emergency power level control circuitry is further configured to ramp down power from Preduced to Pmin over the ramp down time period, starting at tF.

14. The system of claim 10, wherein the selected test protocol comprises operating the emergency power level control circuitry at FRP to deliver power to a lighting load for X minutes; operating the emergency power level control circuitry to deliver Pmin to the lighting load for Y minutes, where $X \leq Y$; and increasing the power level of the emergency power level control circuitry to FRP for Z minutes, starting after Y minutes, until a low voltage disconnect event occurs; wherein the normalized output capacity determination circuitry is configured to determine a battery output capacity based on the power delivered during the X, Y and Z time periods; and wherein the normalized output capacity determination circuitry is configured to determine the normalized output capacity of the battery as: normalized output capacity=output capacity/selected temperature factor.

15. A non-transitory storage device that includes machine-readable instructions that, when executed by one or more processors, cause the one or more processors to perform operations comprising:

detect a power outage of input power being used to charge a rechargeable battery;

determine an available output capacity (ACP) of the battery based on a normalized output capacity of the battery; and determine a lighting protocol to cause a controller to deliver a foldback power level to a lighting load coupled to the battery, based on full rated power (FRP) of the controller; the lighting protocol also being based on determining if ACP is less than a selected value; wherein the foldback power has a first power level Preduced, where Preduced is less than FRP, delivered for a first time period, a second ramped down power level delivered for a ramp down time period tramp, and a third minimum power level Pmin delivered for a third time period;

determine one or more temperature factors of the battery; wherein each temperature factor represents an output capacity performance of the battery for each temperature; and determine ACP based on a selected temperature factor;

determine the normalized output capacity of the battery based on a selected test protocol and a temperature factor correlated to the test temperature;

determine ACP as ACP=normalized output capacity*selected temperature factor; and determine a safety factor and modify the normalized output capacity using the safety factor; wherein the safety factor represents a weighting factor on the battery output capacity having a value less than 1.

16. The non-transitory storage device of claim 15, wherein the machine-readable instructions, when executed by one or more processors, cause the one or more processors to perform operations comprising:

determine another lighting protocol to deliver a power level equivalent to the FRP, based on comparing the ACP to a second selected value.

17. The non-transitory storage device of claim 15, wherein the machine-readable instructions, when executed by one or more processors, cause the one or more processors to perform operations comprising:

determine another lighting protocol to deliver a reduced power level of the emergency power level control circuitry (Preduced), based on determining if ACP is between a second selected value and the first selected value.

18. The non-transitory storage device of claim 15, wherein the FRP of the emergency power level control circuitry is based on a capacity of the battery and a requirement of a lighting load coupled to the emergency power level control circuitry and the battery.

19. The non-transitory storage device of claim 15, wherein the machine-readable instructions, when executed by one or more processors, cause the one or more processors to perform operations comprising:

determine a foldback start time, tF, based on ACP and FRP; wherein tF occurs at the end of the first time period.

20. The non-transitory storage device of claim 15, wherein the ramp down time period is selected to minimize perceived changes in lighting; and wherein power is ramped down from Preduced to Pmin over the ramp down time period, starting at tF.

21. The non-transitory storage device of claim 15, wherein the selected test protocol comprises operating the emergency power level control circuitry at FRP to deliver power to a lighting load for X minutes; operating the emergency power level control circuitry to deliver Pmin to the lighting load for Y minutes, where X≤Y; and increasing the power level of the emergency power level control circuitry to FRP for Z minutes, starting after Y minutes, until a low voltage disconnect event occurs; wherein the machine-readable instructions, when executed by one or more processors, cause the one or more processors to perform operations comprising:

determine a battery output capacity based on the power delivered during the X, Y and Z time periods; and determine the normalized output capacity of the battery as: normalized output capacity=output capacity/selected temperature factor.

* * * * *